(12) United States Patent
Zeleznik et al.

(10) Patent No.: US 12,497,000 B2
(45) Date of Patent: Dec. 16, 2025

(54) VEHICLE IN-CABIN AUDIO DETECTION OF VANDALISM

(71) Applicant: ASPINITY, INC., Pittsburgh, PA (US)

(72) Inventors: Matthew Zeleznik, Pittsburgh, PA (US); Madhumita Harish, Pittsburgh, PA (US); Brandon David Rumberg, Pittsburgh, PA (US); Thomas Doyle, Laguna Niguel, CA (US)

(73) Assignee: ASPINITY, INC., Pittsburgh, PA (US)

( * ) Notice: Subject to any disclaimer, the term of this patent is extended or adjusted under 35 U.S.C. 154(b) by 0 days.

(21) Appl. No.: 18/424,054

(22) Filed: Jan. 26, 2024

(65) Prior Publication Data

US 2025/0214535 A1 Jul. 3, 2025

Related U.S. Application Data

(60) Provisional application No. 63/615,517, filed on Dec. 28, 2023.

(51) Int. Cl.
*B60R 25/01* (2013.01)
*B60R 25/10* (2013.01)
*B60R 25/30* (2013.01)

(52) U.S. Cl.
CPC ............ *B60R 25/302* (2013.01); *B60R 25/01* (2013.01); *B60R 25/1009* (2013.01); *B60R 25/305* (2013.01)

(58) Field of Classification Search
None
See application file for complete search history.

(56) References Cited

U.S. PATENT DOCUMENTS

| | | | |
|---|---|---|---|
| 9,610,921 B2 * | 4/2017 | Kyung | B60R 25/32 |
| 9,676,368 B2 * | 6/2017 | Guo | B60R 25/00 |
| 9,747,795 B1 * | 8/2017 | Espinosa | G08B 15/02 |
| 10,832,672 B2 * | 11/2020 | Gordon | G06F 21/6245 |
| 10,899,317 B1 * | 1/2021 | Moeller | B60R 25/30 |
| 11,214,236 B2 * | 1/2022 | Safir | G08B 31/00 |
| 11,541,844 B2 * | 1/2023 | Murray | B60R 25/1012 |
| 2003/0080878 A1 * | 5/2003 | Kirmuss | G11B 27/36 |
| | | | 348/E7.086 |

(Continued)

OTHER PUBLICATIONS

"PCT Notification of Transmittal of the International Search Report and the Written Opinion of the International Searching Authority", Jan. 28, 2025 (Jan. 28, 2025), for International Application No. PCT/US2024/062254, 8pgs.

*Primary Examiner* — Jonathan M Dager
(74) *Attorney, Agent, or Firm* — Buckley, Maschoff & Talwalkar LLC

(57) ABSTRACT

According to some embodiments, a sound sensor is located in an automotive vehicle cabin. A processor coupled to the sound sensor is configured to receive an acoustic signal sensed by the sound sensor and automatically determine a vehicle event that occurred based on an analysis of the acoustic signal. The determined vehicle event may be, for example, associated with an impact to the vehicle and/or vandalism monitoring while the vehicle is parked. In some embodiments, the processor automatically triggers a vehicle action responsive to the determined vehicle event. The acoustic signal may be analyzed through linear signal processing techniques and/or machine learning performed via analog processing.

19 Claims, 12 Drawing Sheets

(56) References Cited

U.S. PATENT DOCUMENTS

| | | | | |
|---|---|---|---|---|
| 2004/0263323 | A1* | 12/2004 | Seike | B60R 25/33 |
| | | | | 340/426.1 |
| 2006/0087411 | A1* | 4/2006 | Chang | B60R 25/305 |
| | | | | 340/426.18 |
| 2008/0157940 | A1* | 7/2008 | Breed | B60N 2/0035 |
| | | | | 340/425.5 |
| 2016/0328642 | A1* | 11/2016 | Himebaugh | G06F 1/3209 |
| 2018/0108369 | A1* | 4/2018 | Gross | G06N 3/084 |
| 2020/0216026 | A1* | 7/2020 | Price | G08B 13/19647 |
| 2020/0320309 | A1* | 10/2020 | Nagata | G08B 31/00 |
| 2020/0349345 | A1* | 11/2020 | Hodge | G06V 20/59 |
| 2021/0114606 | A1* | 4/2021 | Alvarez | B60W 60/00188 |
| 2021/0170989 | A1* | 6/2021 | Cameron | B60R 25/1004 |
| 2021/0183406 | A1* | 6/2021 | Rogers | G06N 5/04 |
| 2021/0233552 | A1* | 7/2021 | Kobayashi | G10L 21/0324 |
| 2021/0387584 | A1* | 12/2021 | Daniels | G06V 20/58 |
| 2021/0397863 | A1* | 12/2021 | Kose Cihangir | G06V 20/59 |
| 2022/0024484 | A1* | 1/2022 | Armstrong-Crews | |
| | | | | B60W 40/02 |
| 2022/0126864 | A1* | 4/2022 | Moustafa | B60W 40/09 |
| 2022/0169206 | A1* | 6/2022 | Moeller | G06F 8/65 |
| 2023/0101366 | A1* | 3/2023 | Cahill | G10K 11/346 |
| | | | | 381/56 |
| 2023/0342855 | A1* | 10/2023 | Sanchez | G06N 20/00 |
| 2024/0055012 | A1* | 2/2024 | Wang | G10L 21/0224 |

* cited by examiner

VEHICLE IN-CABIN AUDIO DETECTION OF VANDALISM

CROSS-REFERENCE TO RELATED APPLICATIONS

The present application claims the benefit of U.S. Patent application Ser. No. 63/615,517 entitled "VEHICLE IN-CABIN MICROPHONE TO DETECT VANDALISM" and filed on Dec. 28, 2023. The entire content of that application is incorporated herein by reference.

BACKGROUND

A vehicle, such as an automobile, may be left unattended, including when it is parked on the street, in a driveway, in a parking lot, etc. At these times, the vehicle may be vulnerable to damage, such as malicious acts of vandalism (e.g., by striking the vehicle with an object, scratching the vehicle with a key or other sharp object, etc.). Automatically detecting such acts to help prevent or minimize damage can be a difficult task. Often, a smart vehicle is embedded with different types of sensors (e.g., cameras, Light Detection and Ranging ("LIDAR"), radar, engine sensors, brake sensors, pedal sensors, steering wheel sensors, and many others. The sensors capture data both in and around the vehicle and enable many of the smart features of the vehicle. One of the constraints with sensors is that they consume power when they are "on" and capturing data. The power often comes from an energy source within the vehicle such as the vehicle's battery. But the amount of power that is available on a vehicle is limited. This is especially the case for vehicles that are powered by rechargeable batteries. Moreover, it is desirable to reduce the occurrence of "false positive" detections of potential vandalism. For example, an ambulance with a siren that drives past a parked vehicle should not trigger an automatic detection of potential vandalism. As such, there is a need for sensors and a sensing system that provides improved vandalism prevention with a strict power budget.

Note that in some cases, a vehicle may already include one or more dashboard mounted cameras or "dashcams" for motion monitoring. Such implementations are typically associated with high power usage and memory requirements. Other vehicles may have "G-sensors" such as an accelerometer, a gyroscope or an Inertial Measurement Unit ("IMU") to monitor structural vibration with relatively high noise floors. Still other vehicles have an integrated audio input device (e.g., a microphone) for keyword and/or hands-free driving operations.

It would be desirable to provide power efficient vandalism detection for a vehicle in an accurate, automatic, and efficient manner.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

Figure 1:
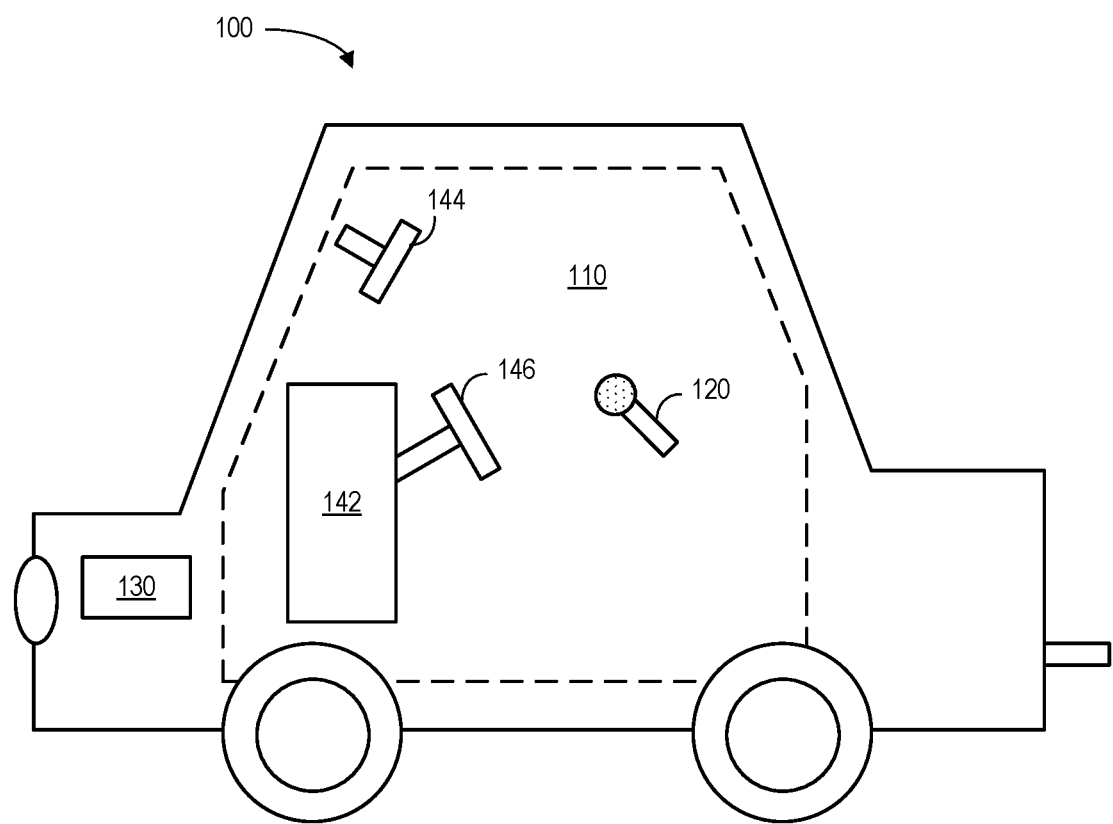
FIG. 1 is a high-level system architecture in accordance with some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein provide a new way to detect vehicle vandalism. For example, FIG. 1 is a high-level system 100 architecture in accordance with some embodiments. The system 100 includes a vehicle cabin 110 in which a driver and/or one or more passengers may sit and/or operate the vehicle. A sound sensor 120, such as a microphone, may be located within the vehicle cabin 110 and provide an acoustic signal to a processor 130 (which might be located within or external to the vehicle cabin 110). For example, the sound sensor 120 might be located within a vehicle dashboard 142, a rearview mirror 144, a steering wheel 146, etc. According to some embodiments, a remote operator or administrator device may be used to configure or otherwise adjust elements of the system 100.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The processor 130 may store information into and/or retrieve information from various data stores (e.g., a vehicle event database), which may be locally stored or reside remotely from the processor 130. Although a single sound sensor 120 and processor 130 are shown in FIG. 1, any number of such devices may be included. Moreover, various devices described herein might be combined according to embodiments of the present invention. For example, in some embodiments, the sound sensor 120 and the processor 130 might comprise a single apparatus. Some of the system 100 functions may be performed by a constellation of networked apparatuses, such as in a distributed processing or cloud-based architecture.

A user may access the system 100 via a remote device (e.g., a Personal Computer ("PC"), tablet, or smartphone) to view information about and/or manage operational information in accordance with any of the embodiments described herein. In some cases, an interactive Graphical User Interface ("GUI") display may let an operator or administrator define and/or adjust certain parameters via a remote device (e.g., to specify vandalism detection parameters or thresholds) and/or provide or receive automatically generated recommendations, alerts, or results associated with the system 100.

Figure 2:
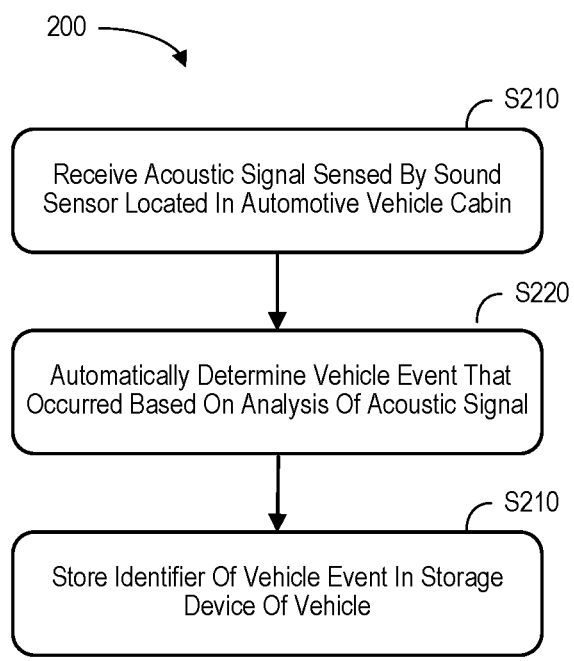
FIG. 2 is a method according to some embodiments.

FIG. 2 is a method 200 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a processor may receive an acoustic signal sensed by a sound sensor located in an automotive vehicle cabin. At S220, the system may automatically determine a vehicle event that occurred based on an analysis of the acoustic signal. The vehicle event might be associated with an impact to the vehicle, vandalism monitoring while the vehicle is parked, etc. Examples of detected events include finger tapping, knuckle tapping, fist tapping, an open-palm slap, being hit by an object or another vehicle, etc. At S230, the system may store an identifier of the vehicle event in a storage device of a vehicle (e.g., in a vehicle event database). According to some embodiments, the acoustic signal is analyzed through linear signal processing techniques to distinguish vandalism events from non-vandalism events. Moreover, features may be extracted through the linear signal processing techniques and used to distinguish vandalism events from non-vandalism events. The features may be used, in some embodiments, with a machine learning based neural network signal processing system to distinguish vandalism events from non-vandalism events.

According to some embodiments, the processor is further configured to receive a supplemental signal sensed by a supplemental sensor (either inside or outside the cabin). In this case, the vehicle event may automatically be determined further based on an analysis of the supplemental signal. The supplemental sensor might be associated with, for example, an accelerometer, a gyroscope, an Inertial Measurement Unit ("IMU") sensor, etc. Other examples of supplemental sensors include a video camera, a Passive Infra-Red ("PIR") sensor, a piezoelectric vibration sensor, a millimeter-wave sensor, an optical time-of-flight sensor, etc. In some embodiments, the analysis of the acoustic signal is performed via analog processing.

Figure 3:
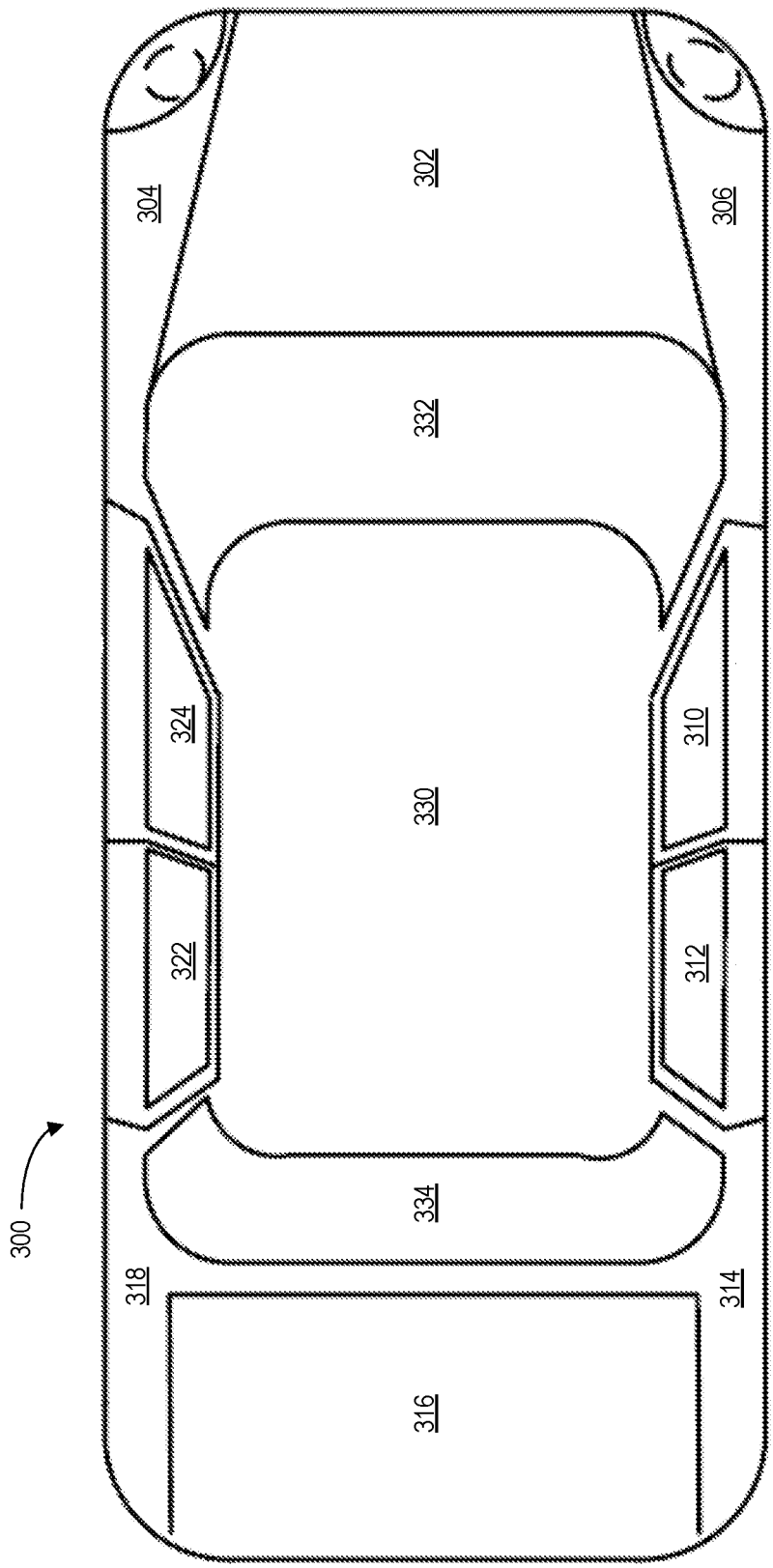
FIG. 3 is a diagram illustrating a vehicle in accordance with an example embodiment.

In this way, embodiments may use an acoustic signal detected inside of vehicle cabin to determine if a parked vehicle is being vandalized. A microphone inside of a vehicle cabin provides a signal to signal processing hardware. The signal processing hardware and associated software can then use the audio signal to determine if vandalism has occurred. Such a solution may leverage the inherent noise isolation within the vehicle cabin. For example, sounds originating outside of the vehicle may be strongly attenuated because the sound must vibrate the vehicle surface which, in turn, transmits the sound into the cabin. In contrast, contact with the vehicle surface directly transmits sound into the cabin. The resulting audio signal therefore has an inherently high Signal-to-Noise Ratio ("SNR") which can help case signal processing challenges and enable improved signal processing possibilities. FIG. 3 illustrates a vehicle 300 in accordance with an example embodiment. Referring to FIG. 3, various portions of the vehicle 300 may have soundproofing or dampening characteristics. In particular, the materials, dimensions, tolerances, etc. may be optimized for soundproofing in connection with a vehicle hood 302, a front driver-side quarter panel 304, a front passenger-side quarter panel 306, a front passenger-side door 310, a rear passenger-side door 312, a rear passenger-side quarter panel 314, a trunk 316, a rear driver-side quarter panel 318, a rear driver-side door 322, a front driver-side door 324, a roof 330, a windshield 332, a rear window 334, etc. Because of soundproofing characteristics, the automatic vehicle event detection may more easily reject background noises such as those generated by a highway and trucks, trains, weather (e.g., thunder), construction, children playing basketball nearby, other car horns and alarms, garbage trucks, police, firetruck, and ambulance alarms, etc.

In some embodiments, multiple analog processing systems may be integrated into various portions of the vehicle 300. For example, multiple analog processing systems may be integrated into the single vehicle 300. In particular, the multiple analog processing systems may be integrated into a plurality of parts of the vehicle which provides a high degree of localization. Each part may be monitored separately using a different respective analog processing system. In this scenario, the analog processing system has a smaller area to cover and may provide more accuracy. Furthermore, the different analog processing systems may include different logic, libraries, and the like, and may perform different tasks.

As another example, the vehicle 300 may have just one analog processing system that is integrated into the vehicle such as an in-cabin location on the dashboard, etc. In some cases, a single machine learning processor may include logic for detecting multiple types of events. Here, the single analog processing system may pick up any impact on the vehicle regardless of the location of the impact.

Figure 4:
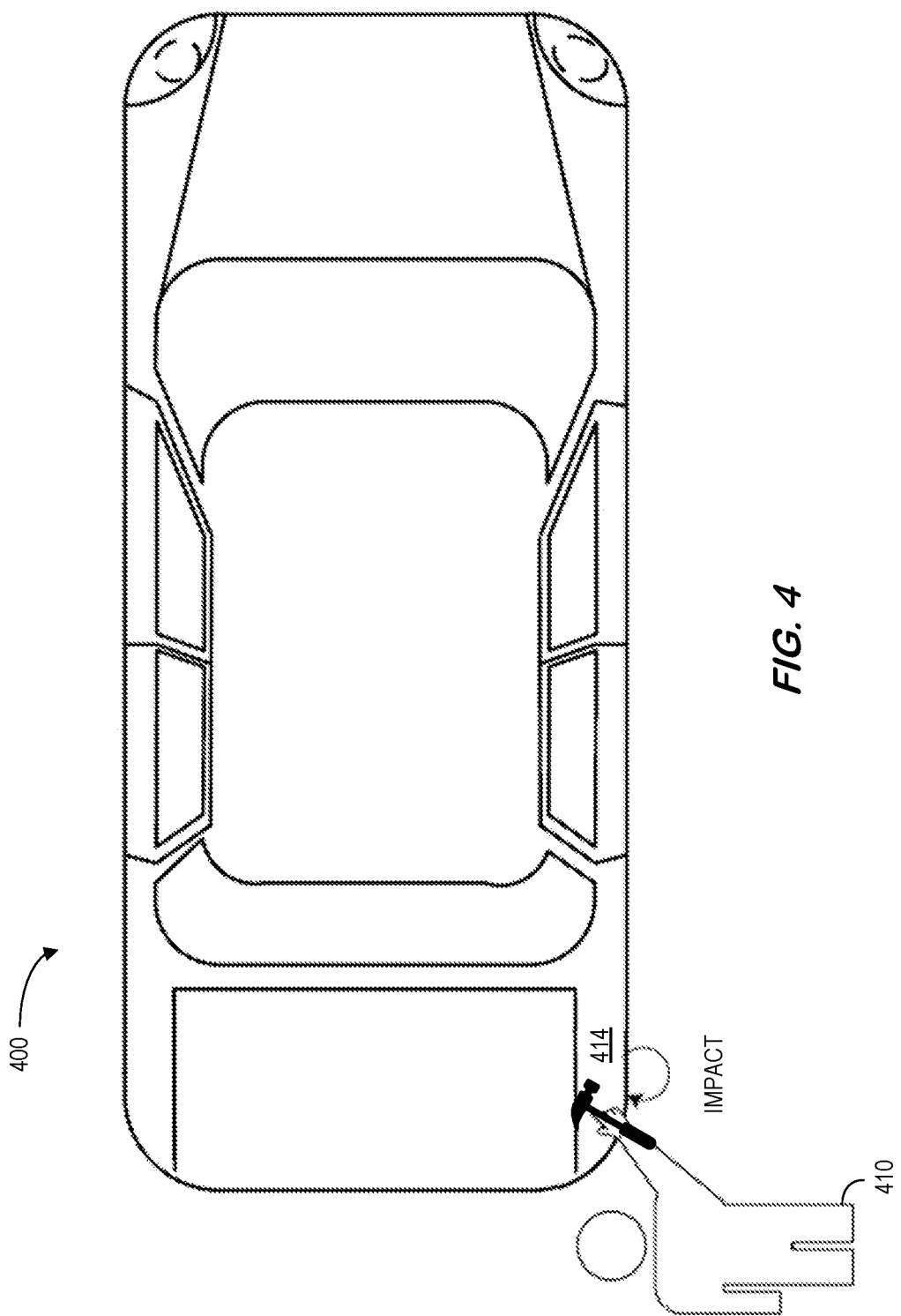
FIG. 4 is a diagram illustrating an example embodiment.

FIG. 4 illustrates a process of an automated vehicle 400 vandalism detection that is triggered based on data sensed by an in-cabin sound sensor in accordance with example embodiments. For example, a person 410 may use their hand or an object (e.g., a hammer) to impact a rear passenger-side quarter panel 414 of the vehicle 400. The impact may be detected by a processor, such as an analog processing system. Here, the processor may evaluate sensor data that is captured by one or more in-cabin sound sensors (and, in some cases, supplemental types of sensors) and determine a type of vehicle event that has occurred.

In this example, the processor may receive the sound sensor data via analog circuitry and compare a sound detected by the sound sensor along with a pressure sensed by a piezoelectric sensor to detect an impact. Here, the sensor data may be input through the algorithm within the analog circuitry which determines the type of event that occurred. For example, the sound may be analyzed by the one or more libraries 721 shown in FIG. 7 which have parameters associated therewith. The parameters may be identified from a parameter database which includes parameters (e.g., sensor value ranges, etc.) which indicate a type of vehicle event (e.g., a key scratch). The parameters may indicate if the pressure value is above zero but below a certain threshold, the analog processing system may determine that the input is a touch input. If, however, the pressure value is greater, analog processing system may determine that the input is an impact such as a hammer, rock or brick, a bike, a car, a shopping cart, a person, an animal, and the like.

In some embodiments, the analog processing system may communicate with a software application that is remote and/or external from the analog processing system. The software application may be installed within a computer of the vehicle 400 (not shown), a remote server, a user device of an occupant within the vehicle 400, another vehicle that is external from the vehicle 400, and the like. For example, the remote software application may be used to reconfigure the logic of an analog machine learning processor to enable the addition of new functions, remove functions, and the like. Furthermore, the remote software application may receive messages from the analog machine learning processor.

Figure 5:
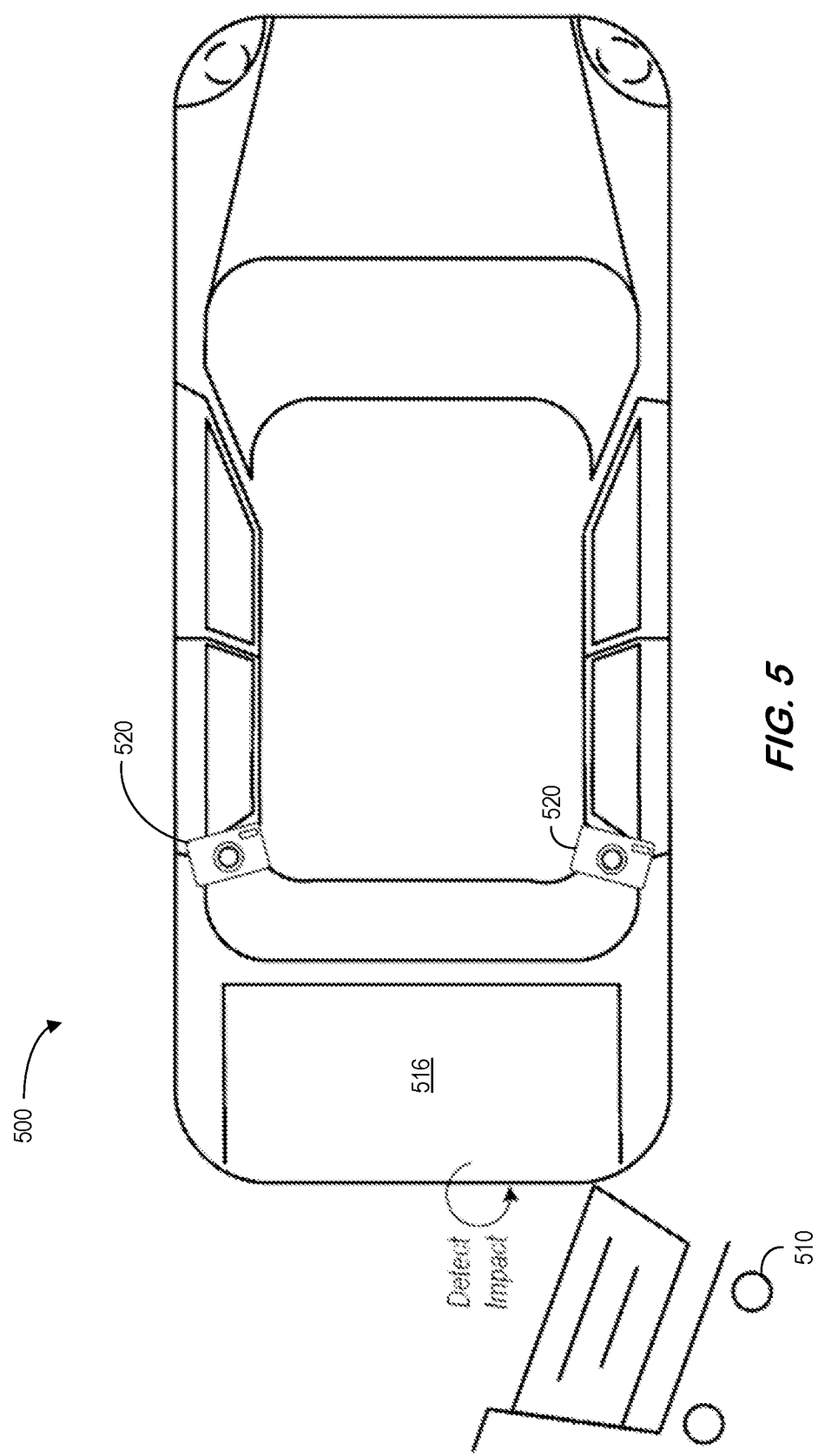
FIG. 5 is a diagram illustrating another example embodiment.

FIG. 5 illustrates an automated vehicle 500 operation that is triggered based on data sensed by an in-cabin sound sensor in accordance with example embodiments. For example, FIG. 5 illustrates a process of a shopping cart 510 rolling into the trunk 516 of the vehicle 500. The impact from the shopping cart 510 may be detected by analyzing acoustic data along with an analog processing system which is integrated into trunk 516 of the vehicle 500. Here, the analog processing system may evaluate sensor data that is captured by one or more sensors of the analog processing system (e.g., a piezoelectric sensor) and determine a type of vehicle event that has occurred.

In this example, the analog processing system may compare a sound detected by the sound sensor along with a pressure sensed by the piezoelectric sensor to detect that an impact has occurred that may cause damage to the vehicle 500. The severity of the impact may be identified from a parameter database which includes parameters (e.g., sensor value ranges, etc.) which indicate a type of vehicle event. For example, the parameters may indicate if the sound value is above a first threshold but below a second threshold, the processor may determine that the input is an impact and should turn on a camera 520 of the vehicle 500 to record any possible clues as to the cause of the damage.

For example, the system may activate an external camera 520 in response to the detected impact to the trunk 516 of the vehicle 500. In this example, an analog processing system may contain its own logic that can analyze the sensor data, for example, via machine learning. The model(s) may be executed on the sensor data to identify a type of vehicle event that occurred, a type of response to perform with the vehicle 500, whether authentication is necessary, and the like. In this example, the impact from the shopping cart 510 detected by an analog processing system triggers the analog processing system to request the software application to activate two rear cameras 520 installed on an exterior of the vehicle 500. It should be appreciated that this is just an example. As another example, different types of sensors, multiple types of sensors, and the like, may be triggered based on a detected impact. In some embodiments, multiple cameras 520 may be triggered. However, another example is that the software application may only activate a camera 520 that is nearest to the detected impact. Thus, the camera 520 activation can be localized to where the impact occurred on the vehicle 500.

Note that digital-based machine learning systems typically must convert sensor data into digital data before executing a machine learning model on the sensor data. This often results in all of the sensor data being converted, even though only a small portion of the sensor data is relevant to the particular use case. The result is an inefficient design that consumes more power than necessary, and runs extra operations on the sensor data than is necessary.

According to some embodiments, each analog processing system may be on at all times and draw power from an energy source of a vehicle such as a battery. In some embodiments, the battery may be a rechargeable battery. The low power analog design of an analog processing system may limit the amount of power that is consumed by the analog processing system.

Some embodiments are directed to an analog processing system that relies on an analog circuit instead of a digital circuit. The design of the analog processing system is flexible and programmable, and consumes less power than traditional sensor-based machine learning systems. The analog processing system may include one or more sensors attached to the analog circuit, a microprocessor, a storage, an interface, signal processing modules, and the like, which are also attached to the analog circuit and in communication with the other components within the analog processing system. The sensors may be affixed to the analog circuit providing for efficient sensor integration and communication with a machine learning model(s) stored by the analog processing system.

The analog processing system may be integrated within a system (e.g., a vehicle, a structure, other type of device or system, etc.) and may detect activities that occur with respect to the system. For example, the sensors may capture sensor data of any events that occur in and around a vehicle such as a user placing their hand on a portion of the vehicle, a key scratch being drawn on the vehicle, and the like. As another example, the sensor data may capture events such as impacts that occur from other objects such as vehicles, bikes, car doors, shopping carts, and the like. The sensor data may be processed by the machine learning model to yield actionable results that can be used by the vehicle (e.g., software of the vehicle) to take additional actions with the vehicle.

The analog processing system may be ultra-low power yet provide high-performance solutions. This enables the analog processing system to be turned "on" continuously without using too much power. In fact, a vehicle may be embedded with multipole analog processing systems at different parts of the vehicle.

The machine learning models may be developed using PYTHON® or other programming languages. The machine learning models may be deployed on the analog processing system, a vehicle, a structure, a server, and the like. Algorithms can be loaded into a memory of the analog circuit which can address different types of software applications and use cases. Furthermore, the offset and/or the mismatch of the sensors can be tuned when they are added to the analog circuit, thereby preventing such tuning from needing to be performed later on by a user. The analog processing system provides the low power of an analog circuit, with the versatility, repeatability and usability similar to a digital circuit.

Figure 6A:
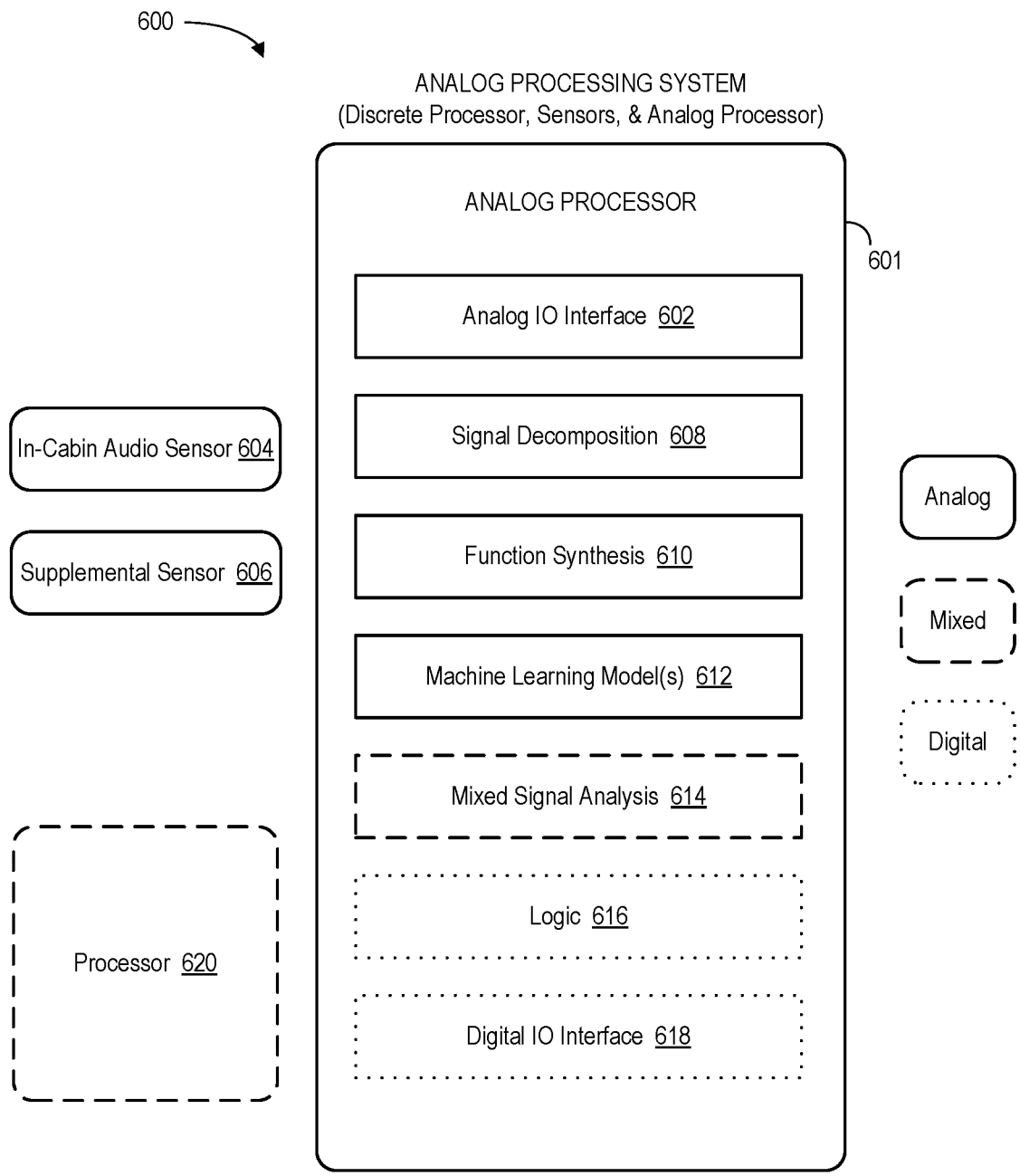
FIG. 6A is a diagram illustrating an analog processing system with a discrete processor, sensors, and analog processor in accordance with an example embodiment.

FIG. 6A is a diagram illustrating an analog processing system 600 with a discrete processor, sensors, and analog processor in accordance with an example embodiment. The analog processing system 600 may include an analog processor 601 with an analog Input Output ("IO") interface 602 that is capable of input and output of analog communications with other devices and systems within the vehicle. The analog processing system 600 may include sensors such as an in-cabin audio sensor 604 (e.g., a microphone, etc.) that is capable of listening for and recording sensor data of sounds that occur (e.g., changes in sound, etc.). As another example, the analog processing system 600 may include a supplemental sensor 606 (e.g., a piezoelectric sensor) that is capable of listening for and measuring changes in one or more attributes such as pressure, acceleration, temperature, strain, force, and the like.

The analog processing system 600 may include a signal decomposition module 608, a function synthesis module 610, one or more optional machine learning models 612, a mixed signal analysis module 614, programmable logic 616, and a digital IO interface 618 that is capable of receiving digital communications from other systems and software within the vehicle. The analog processing system 600 also includes a processor 620 (e.g., a microprocessor or microcontroller) that is capable of managing and controlling the operation of the other components within the analog processing system 600. The processor 620 may also be attached to the analog circuit and may be coupled to the sensors 604, 606 and other components.

The analog processor 601 can be configured via software to perform a specific function such as detecting events and waking up other components within the system. The configuration of the various components illustrated in FIG. 6A may be defined in software and stored in memory. Furthermore, specific operation and tuning of each analog component may also be stored in memory. For example, the processor 620 may communicate data stored in memory to various blocks in FIG. 6A to replicate the functional "signal" chain developed in software.

In this example, the audio sensor 604 and/or the supplemental sensor 606 may sense data in the vehicle, around the vehicle, as it hits the vehicle, etc. The sensing may be performed while the vehicle is parked and not operating, when the vehicle is on and not operating, when the vehicle is on and moving, and the like. The analog processing system 600 may draw power from the vehicle's battery, engine, and/or other sources including while the vehicle is off. The amount of power consumed is very limited (e.g., ultra-low, etc.) due to the analog design.

In the example of FIG. 6A, each of the components are operating on the same processing device. As another example, one or more components may be disposed on a separate processing device and be communicably coupled to the other processing device. For example, the machine learning model 612 may be implemented in the separate processing device separate from the remaining components of the analog processing system 600. In this example, the analog processing system 600 may receive the sensor data, analyze it, and output it to the machine learning model on the separate processing device. The machine learning model on the separate processing device may perform similar or different functions as the machine learning model 612 within the analog processing system 600.

Figure 6B:
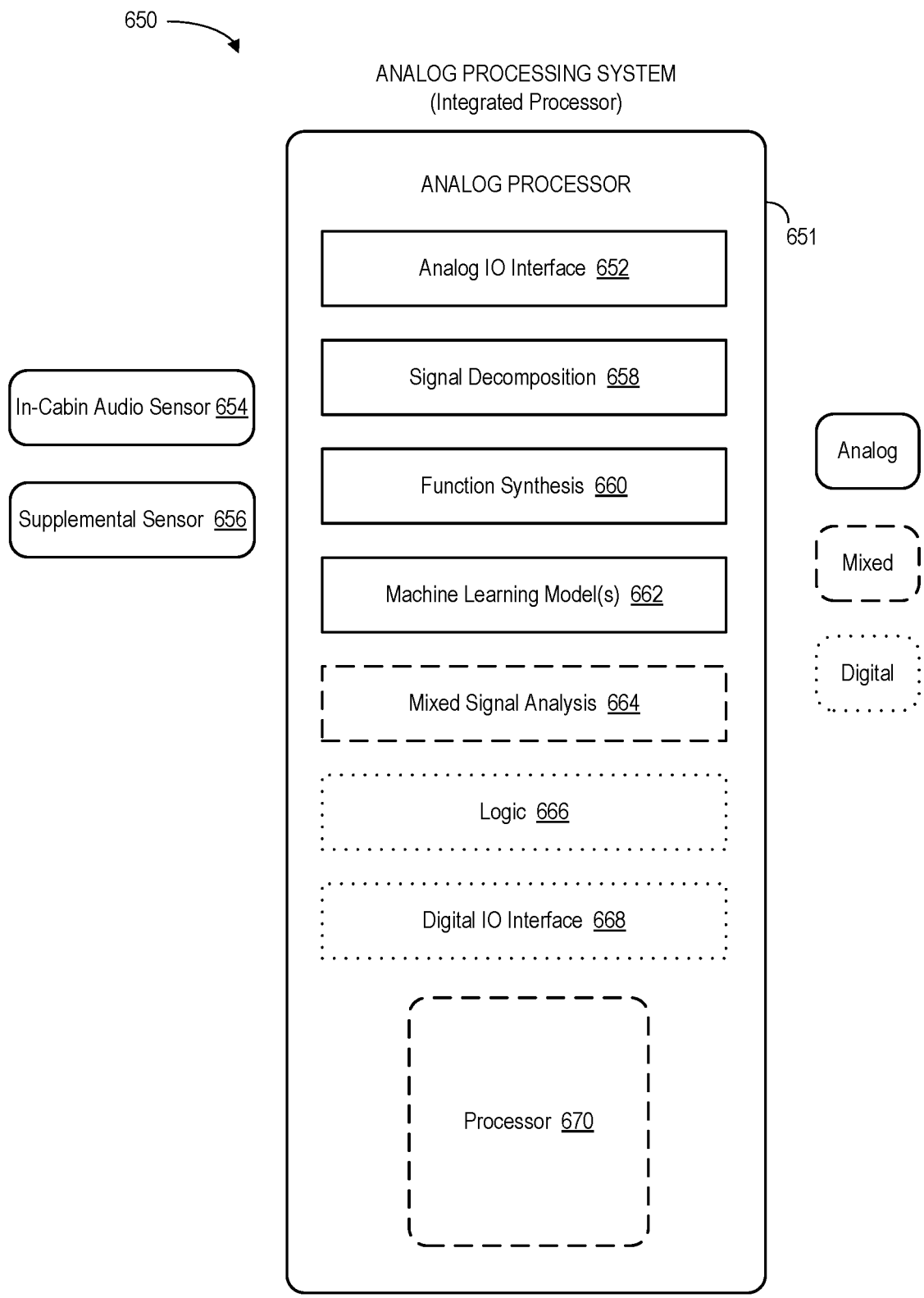
FIG. 6B is a diagram illustrating an analog processing system with an integrated processor according to another embodiment.

FIG. 6B is a diagram illustrating an analog processing system 650 with an integrated processor in accordance with another embodiment. The analog processing system 650 may include an analog processor 651 with an IO interface 652 that is capable of input and output of analog communications with other devices and systems within the vehicle. The analog processing system 650 may include sensors such as an in-cabin audio sensor 654 that is capable of listening for and recording sensor data of sounds that occur. As another example, the analog processing system 650 may include a supplemental sensor 656 that is capable of listening for and measuring changes in one or more attributes such as pressure, acceleration, temperature, strain, force, and the like.

The analog processing system 650 may include a signal decomposition module 658, a function synthesis module 660, one or more optional machine learning models 662, a mixed signal analysis module 664, programmable logic 666, and a digital IO interface 668 that is capable of receiving digital communications from other systems and software within the vehicle. The analog processing system 650 also includes a processor 670 that is capable of managing and controlling the operation of the other components within the analog processing system 650.

Figure 7:
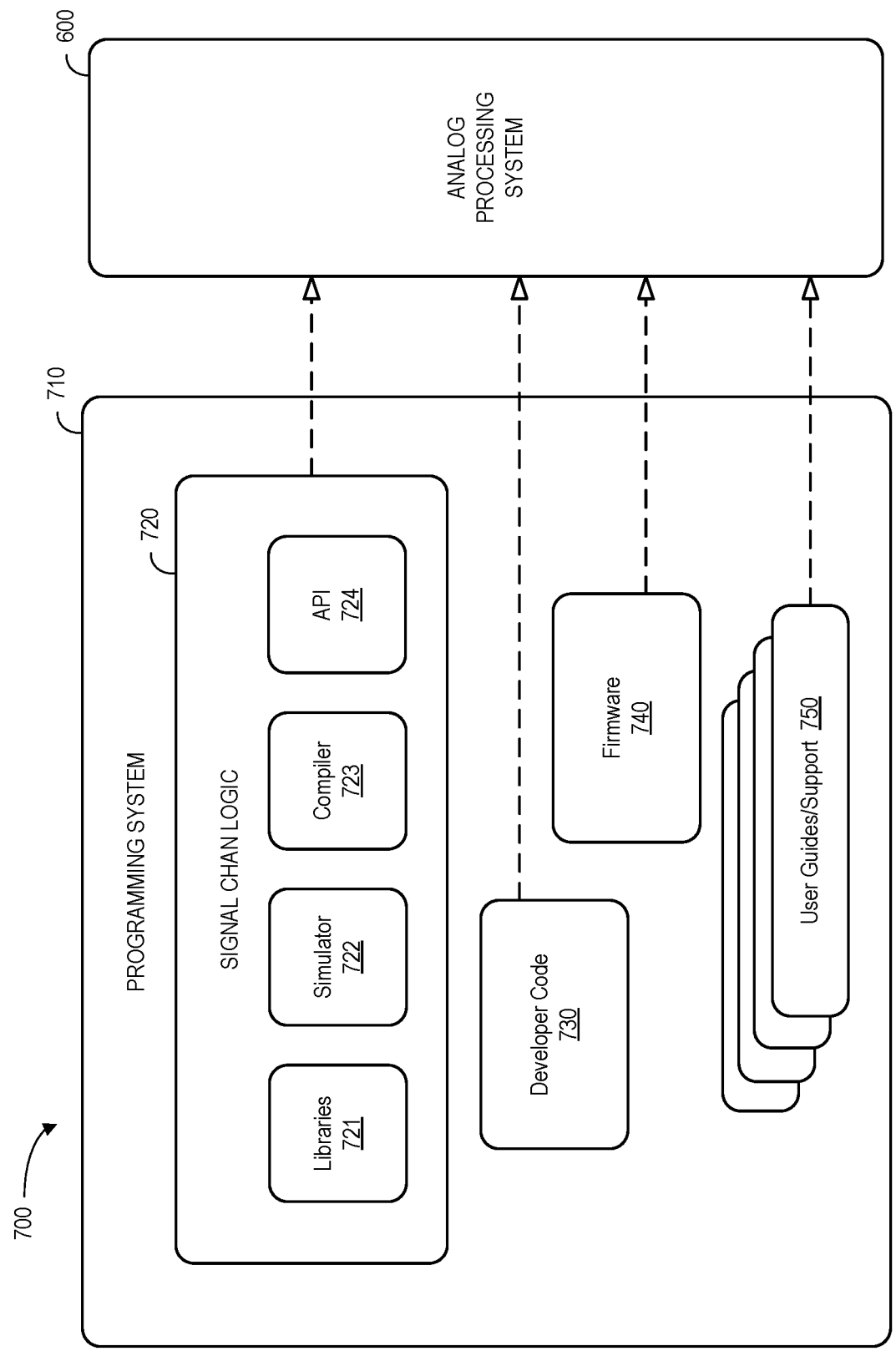
FIG. 7 is a diagram illustrating a process of installing logic onto an analog processing system in accordance with an example embodiment.

FIG. 7 illustrates a process 700 of installing logic onto an analog processing system in accordance with an example embodiment. Referring to FIG. 7, a programming system 710 may program an analog processing system 600 to perform operations that are associated with a vehicle. For example, the programming system 710 may program logic into the analog processing system 600 to identify different noises and sounds, including those associated with vandalism, direct impact from another vehicle, and the like.

In this example, the programming system 710 includes signal chain logic 720 that can be used to perform a sequence of steps via the processor. For example, the signal chain logic 720 may include one or more libraries 721, a simulator 722, a compiler 723, and an API 724. The one or more libraries 721 may include the building blocks for the signal chain. The components for building the algorithm described in connection with FIG. 4, for example, may be functions that are included in the one or more libraries 721. The simulator 722 may simulate the algorithm on software without the hardware connected. The output of the simulator 722 is the expected response. The simulator 722 may be used to test the algorithm before it is embedded into the analog circuit. The compiler 723 may compile code in a programming language, such as PYTHON®, into machine language that can be input to the microprocessor of the analog processing system 600. For example, the compiler 723 may compile logic (e.g., developer code 730, etc.), the programming code of one or more machine learning models installed on the analog processing system 600, and the like. The programming system 710 also includes firmware 740 and user guides 750 that can be accessed by a user when developing logic to be installed on the analog processing system, and the like.

Figure 8:
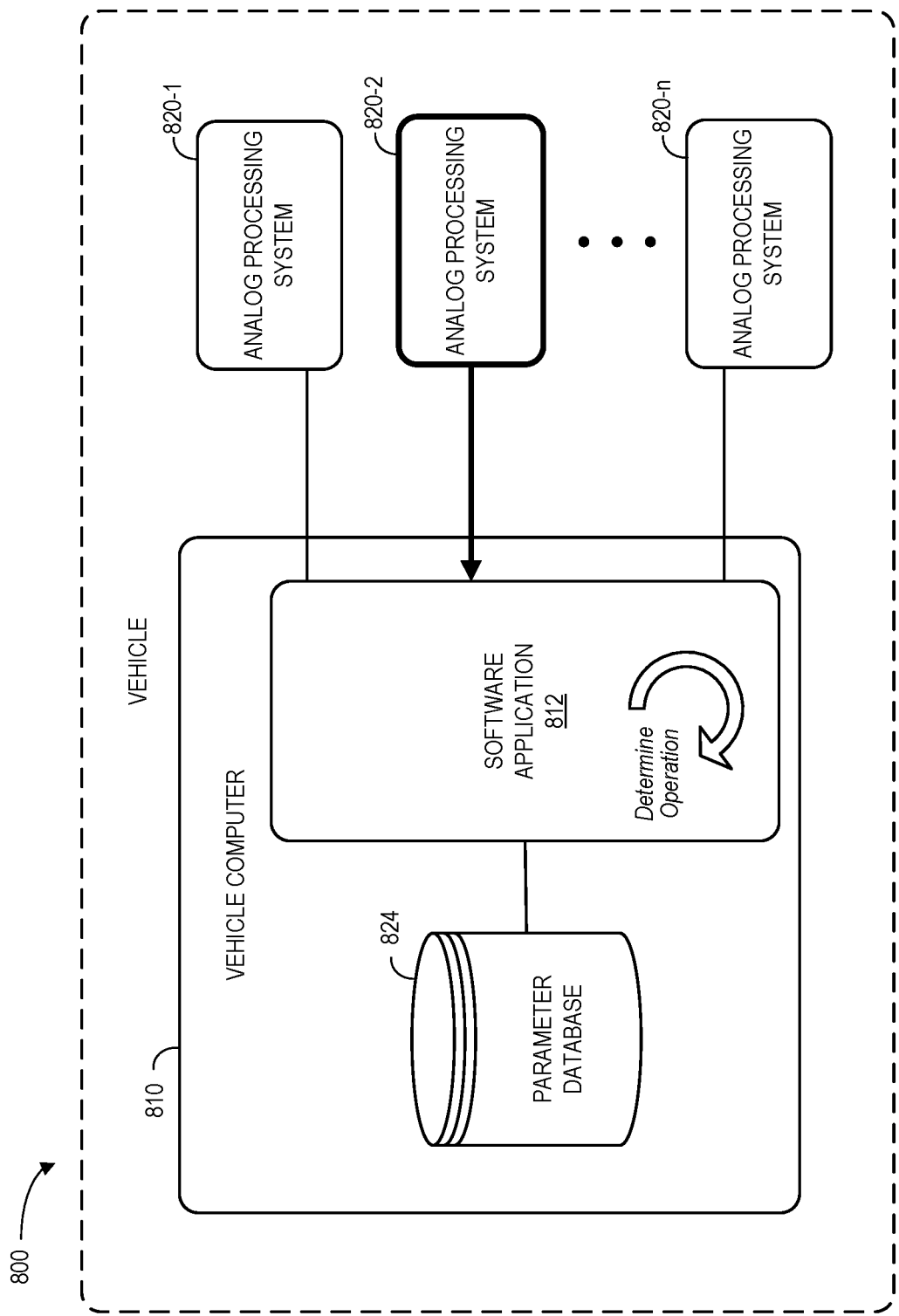
FIG. 8 is a diagram illustrating a logical architecture for a vehicle system in accordance with example embodiments.

FIG. 8 illustrates a logical architecture a vehicle 800 in accordance with example embodiments. Referring to FIG. 8, the vehicle 800 includes a vehicle computer 810 with a software application 812 installed therein. The software application 812 may have different functions, features, methods, commands, and the like, depending on the implementation. In this example, the vehicle computer 810 also includes a parameter database 824 with identifiers of sensor ranges that correspond to different events that can be detected by, for example, an analog processing system described herein.

In this example, the vehicle 800 also includes a plurality of analog processing systems 820-1, 820-2, . . . 820-n that are integrated into different locations on the vehicle 800 and which are communicably coupled to the vehicle computer 810. The plurality of analog processing systems 820-1, 820-2, . . . 820-n may be configured to perform different tasks with respect to each other. For example, one analog processing system may detect a key scratch on a particular location on the vehicle while another detects whether any part of the vehicle has experienced an impact. In this example, any of the analog processing systems may send a trigger or other command to the software application 812 in response to a detected event. The software application 812 may receive the trigger request, compare sensor data within the request to sensor ranges stored within the parameter database 814 to identify a type of impact that has occurred (e.g., impact, key scratch, vehicle, etc.) Furthermore, the software application 812 may activate one or more systems, sub-systems, doors, engine, brakes, and the like based on commands sent from any of the analog processing systems.

Figure 9:
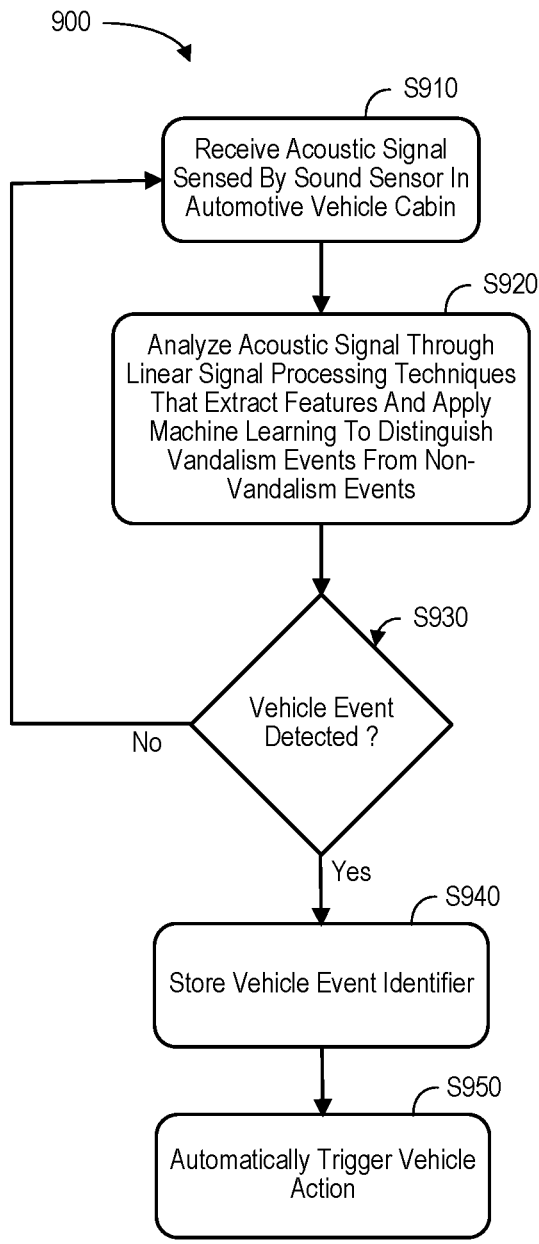
FIG. 9 is a diagram illustrating a method of executing an automated vehicle operation based on sensed data in accordance with an example embodiment.

FIG. 9 illustrates a method 900 of executing an automated vehicle operation based on sensed data in accordance with an example embodiment. For example, the method 900 may be executed by an analog processing system, a software application, a vehicle, a combination of systems, and the like. Referring to FIG. 9, in S910, the method 900 may include receiving an acoustic signal sensed by a sound sensor in an automotive vehicle cabin. At S920, the system may analyze the acoustic signal through linear signal processing techniques that extract features and apply machine learning to distinguish vandalism events from non-vandalism events. The machine learning model may include, for example, one or more algorithms for analyzing sensor data and determining an event that has occurred such as an impact to the vehicle, a part of the vehicle that is impacted, a type of impact, and the like. Based on this data, the system may perform additional operations.

According to some embodiments, the system may further automatically trigger a vehicle action responsive to the determined vehicle event. For example, if no event is detected at S930, the system may continue to receive an acoustic signal at S910. If, however, a vehicle event is detected at S930, the system may store a vehicle event identifier at S940 and automatically trigger a vehicle action at S950. The vehicle action might be associated with, for example, taking a picture, recording a video, recording the acoustic signal, recording a vehicle location, sounding an alarm, locking a lock, initiating an electronic communication, etc. While the method shows the steps as being performed in an order, it should be appreciated that the method is not limited to this order and the steps may be performed in a different order. For example, sensor data from a piezoelectric sensor may be received at the same time or after the system receives the sensor data from the audio sensor.

In some embodiments, the method may further include transmitting an identifier of the determined event to a computing system of the vehicle via an interface. In some embodiments, the method may further include transmitting a request to a software application to authenticate a user with a biometric scan based on the determined event. In some embodiments, the method may further include transmitting a message to a software application to activate an external camera based on the determined event. In some embodiments, the method may further include transmitting a message to a software application to close an automated door on a vehicle based on the determined event. In some embodiments, the method may further include determining an operation to perform with the vehicle based on the sensor data sensed by a second sensor and the sensor data sensed by the sound sensor via the software application, and executing the operation via the vehicle.

Figure 10:
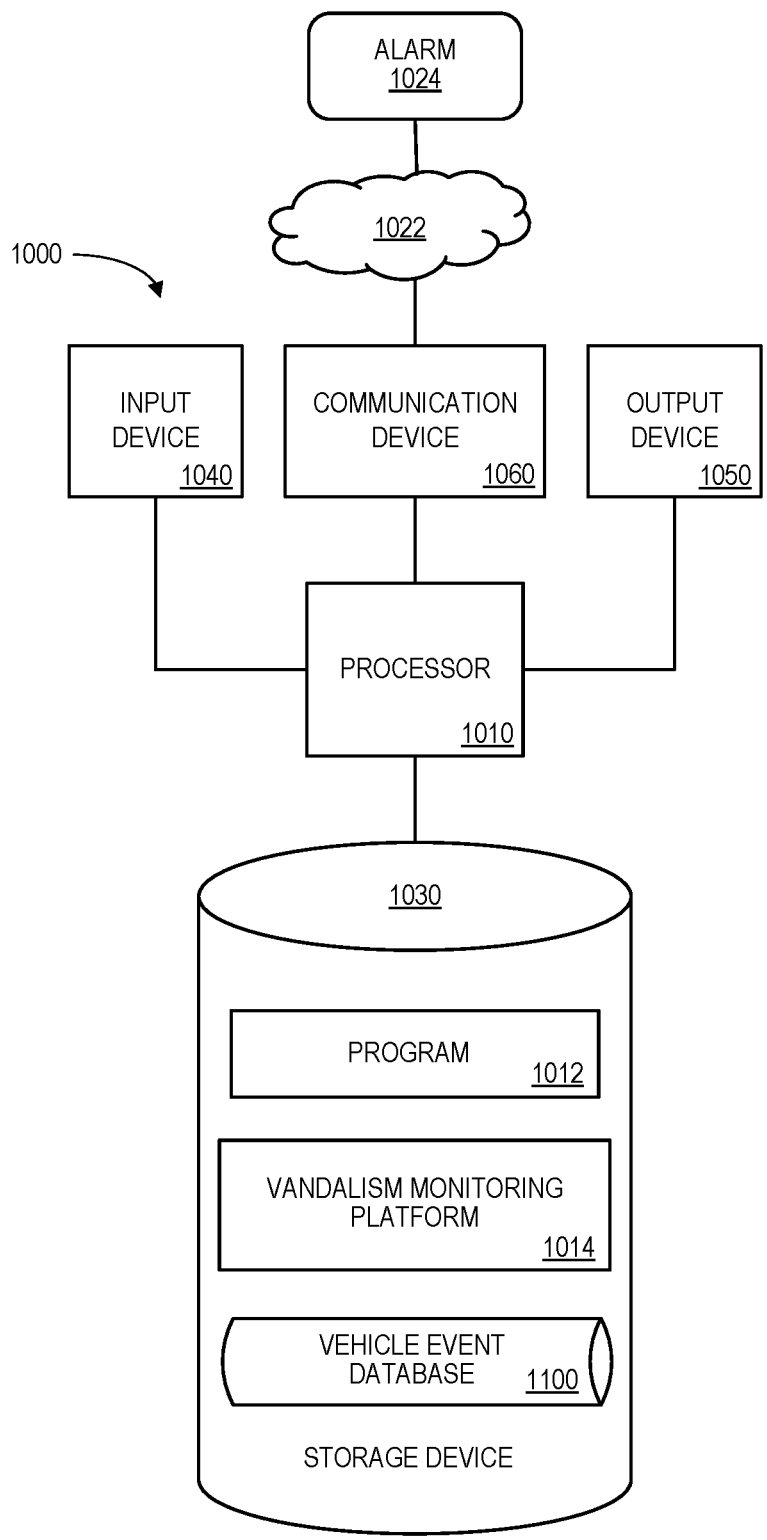
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 100 of FIG. 1 (and/or any other system described herein). The platform 1000 comprises a processor 1010, such as one or more commercially available Central Processing Units ("CPUs") in the form of one-chip microprocessors, coupled to a communication device 1060 configured to communicate via a communication network 1022. The communication device 1060 may be used to communicate, for example, with one or more driver smartphones, administrator platforms, etc. The platform 1000 further includes an input device 1040 (e.g., a computer mouse and/or keyboard to input detection logic, trigger event information, etc.) and/an output device 1050 (e.g., a computer monitor to render a display, transmit recommendations and alerts, and/or create reports about vandalism status, etc.). In some embodiments, signals may be automatically transmitted via the communication network 1022 in response to a detected vehicle event (e.g., to sound an alarm 1024).

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or vandalism monitoring platform 1014 for controlling the processor 1010. The processor 1010 performs instructions of the programs 1012, 1014, and thereby operates in accordance with any of the embodiments described herein. For example, the processor 1010 may receive an acoustic signal sensed by a sound sensor located in an automotive vehicle cabin. The processor 1010 may then automatically determine a vehicle event that occurred based on an analysis of the acoustic signal and store an identifier of the vehicle event in a storage device of a vehicle.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a vehicle event database 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Figure 11:
FIG. 11 is a portion of a tabular vehicle event database in accordance with some embodiments.

Referring to FIG. 11, a table is shown that represents the vehicle event database 1100 that may be stored at the platform 1000 according to some embodiments. The table may include, for example, entries identifying events that occurred in connection with a vehicle. The table may also define fields 1102, 1104, 1106, 1108 for each of the entries. The fields 1102, 1104, 1106, 1108 may, according to some embodiments, specify: a vehicle identifier 1102, a date and time 1104, a detected vehicle event identifier 1106, and a triggered vehicle action 1108. The vehicle event database 1100 may be created and updated, for example, when an impact is detected, an acoustic signal passes a threshold, etc.

The vehicle identifier 1102 might be a unique alphanumeric label that is associated with a particular automobile (e.g., a Vehicle Identification Number ("VIN")). The date and time 1104 may indicate when a particular event was detected. The detected vehicle event identifier 1106 might described, for example, details about the event (e.g., whether the event is potential vandalism, a key scratch, etc.). The triggered vehicle action 1108 might describe what was done in response to the detected event (e.g., an electronic message might have been automatically transmitted to a communication address associated with a smart phone or local police department).

In this way, embodiments may provide power efficient vandalism detection for a vehicle in an accurate, automatic, and efficient manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of vandalism, any of the embodiments described herein could be applied to other types of vandalism.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A system, comprising:
a sound sensor located in an automotive vehicle cabin; and
a processor coupled to the sound sensor, the processor configured to receive an acoustic signal sensed by the sound sensor and automatically determine that a physical vehicle vandalism event occurred based on an analysis of the acoustic signal performed through a plurality of modules configured by external hardware and software programming, the plurality of modules including an analog signal decomposition module, an analog function synthesis module, a mixed signal analysis module, and an analog machine learning processing module that analyze the acoustic signal to detect the physical vehicle vandalism event, wherein the external hardware and software programming includes an analog signal processing building block, a simulator, a compiler, and an Application Programming Interface ("API").

2. The system of claim 1, wherein the physical vehicle vandalism event is an impact to the vehicle.

3. The system of claim 1, wherein the processor is further to automatically trigger a vehicle action responsive to the determined physical vehicle vandalism event.

4. The system of claim 3, wherein the vehicle action is associated with at least one of: (i) taking a picture, (ii) recording a video, (iii) recording the acoustic signal, (iv) recording a vehicle location, (v) sounding an alarm, (vi) locking a lock, and (vii) initiating an electronic communication.

5. The system of claim 1, wherein the determined physical vehicle vandalism event is associated with vandalism monitoring while the vehicle is parked.

6. The system of claim 5, wherein the acoustic signal is further analyzed through analog linear signal processing techniques to distinguish physical vehicle vandalism events from vehicle non-vandalism events.

7. The system of claim 6, wherein features are extracted through the analog linear signal processing techniques and used to distinguish physical vehicle vandalism events from vehicle non-vandalism events.

8. The system of claim 1, wherein a software application automatically triggers activation of a system to perform an additional vehicle operation based on a command sent from the analog circuit when the physical vehicle vandalism event is detected.

9. The system of claim 5, wherein the processor is further configured to receive a supplemental signal sensed by a supplemental sensor and the physical vehicle vandalism event is automatically determined further based on an analysis of the supplemental signal.

10. The system of claim 9, wherein the supplemental sensor is associated with at least one of: (i) an accelerometer, (ii) a gyroscope, and (iii) an Inertial Measurement Unit ("IMU") sensor.

11. The system of claim 9, wherein the supplemental sensor is associated with at least one of: (i) a video camera, and (ii) a Passive Infra-Red ("PIR") sensor.

12. The system of claim 9, wherein the supplemental sensor is associated with at least one of: (i) a piezoelectric vibration sensor, (ii) a millimeter-wave sensor, and (iii) an optical time-of-flight sensor.

13. A vehicle, comprising:
a sound sensor located in an automotive vehicle cabin; and
a processor coupled to the sound sensor, the processor configured to receive an acoustic signal sensed by the sound sensor and automatically determine that a physical vehicle vandalism event, associated with vandalism monitoring while the vehicle is parked, occurred based on an analysis of the acoustic signal performed through a plurality of modules configured by external hardware and software programming, the plurality of modules including an analog signal decomposition module, an analog function synthesis module, a mixed signal analysis module, and an analog machine learning processing module that analyze the acoustic signal to detect the physical vehicle vandalism event, wherein the external hardware and software programming includes an analog signal processing building block, a simulator, a compiler, and an Application Programming Interface ("API").

14. The vehicle of claim 13, wherein the processor is further configured to receive a supplemental signal sensed by a supplemental sensor and the physical vehicle vandalism event is automatically determined further based on an analysis of the supplemental signal.

15. The vehicle of claim 14, wherein the supplemental sensor is associated with at least one of: (i) an accelerometer, (ii) a gyroscope, and (iii) an Inertial Measurement Unit ("IMU") sensor, (iv) a video camera, (v) a Passive Infra-Red ("PIR") sensor, (xi) a piezoelectric vibration sensor, (xii) a millimeter-wave sensor, and (xiii) an optical time-of-flight sensor.

16. A method, comprising:
receiving, by a processor, an acoustic signal sensed by a sound sensor located in an automotive vehicle cabin;
automatically determining that a physical vehicle vandalism event occurred based on an analysis of the acoustic signal performed through a plurality of modules configured by external hardware and software programming, the plurality of modules including an analog signal decomposition module, an analog function synthesis module, a mixed signal analysis module, and an analog machine learning processing module that analyze the acoustic signal to detect the physical vehicle vandalism event, wherein the external hardware and software programming includes an analog signal processing building block, a simulator, a compiler, and an Application Programming Interface ("API"); and
storing an identifier of the physical vehicle vandalism event in a storage device of a vehicle.

17. The method of claim 16, wherein the processor is further to automatically trigger a vehicle action responsive to the determined physical vehicle vandalism event.

18. The method of claim 17, wherein the vehicle action is associated with at least one of: (i) taking a picture, (ii) recording a video, (iii) recording the acoustic signal, (iv) recording a vehicle location, (v) sounding an alarm, (vi) locking a lock, and (vii) initiating an electronic communication.

19. The method of claim 16, wherein the determined physical vehicle vandalism event is associated with vandalism monitoring while the vehicle is parked.

* * * * *